(12) United States Patent
Sata et al.

(10) Patent No.: US 8,626,487 B2
(45) Date of Patent: Jan. 7, 2014

(54) TRANSLATION APPARATUS, TRANSLATION METHOD, COMPUTER PROGRAM, AND RECORDING MEDIUM

(75) Inventors: Ichiko Sata, Osaka (JP); Satoshi Onishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 120 days.

(21) Appl. No.: 13/220,902

(22) Filed: Aug. 30, 2011

(65) Prior Publication Data

US 2012/0059644 A1 Mar. 8, 2012

(30) Foreign Application Priority Data

Sep. 8, 2010 (JP) ................................. 2010-200628

(51) Int. Cl.
*G06F 17/28* (2006.01)
*G06F 17/20* (2006.01)
*G06F 17/27* (2006.01)
*G06F 17/21* (2006.01)
*G10L 21/00* (2013.01)

(52) U.S. Cl.
USPC ................ 704/4; 704/2; 704/3; 704/8; 704/9; 704/10; 704/270; 704/270.1; 704/275

(58) Field of Classification Search
USPC ............ 704/2, 3, 4, 8, 9, 10, 270, 270.1, 275; 382/176, 177, 290, 292, 321
See application file for complete search history.

(56) References Cited

U.S. PATENT DOCUMENTS

| | | | | |
|---|---|---|---|---|
| 5,701,497 A | * | 12/1997 | Yamauchi et al. | 704/3 |
| 7,224,346 B2 | * | 5/2007 | Sheng | 345/171 |
| 7,369,984 B2 | * | 5/2008 | Fairweather | 704/8 |
| 7,783,472 B2 | * | 8/2010 | Nagao et al. | 704/2 |
| 8,290,273 B2 | * | 10/2012 | Prasad et al. | 382/181 |
| 2001/0032070 A1 | * | 10/2001 | Teicher | 704/2 |
| 2003/0171911 A1 | * | 9/2003 | Fairweather | 704/2 |
| 2006/0090123 A1 | | 4/2006 | Denoue et al. | |
| 2006/0206305 A1 | * | 9/2006 | Kimura et al. | 704/2 |
| 2006/0210198 A1 | * | 9/2006 | Suenaga et al. | 382/321 |
| 2008/0195377 A1 | * | 8/2008 | Kato et al. | 704/8 |
| 2008/0233980 A1 | * | 9/2008 | Englund et al. | 455/466 |
| 2009/0171653 A1 | * | 7/2009 | Hecht et al. | 704/3 |
| 2009/0198486 A1 | * | 8/2009 | Chang | 704/2 |
| 2009/0254828 A1 | | 10/2009 | Denoue et al. | |
| 2009/0287471 A1 | * | 11/2009 | Bennett | 704/3 |
| 2010/0211377 A1 | * | 8/2010 | Aoyama et al. | 704/8 |
| 2011/0122448 A1 | * | 5/2011 | Minhas | 358/1.18 |

FOREIGN PATENT DOCUMENTS

| | | |
|---|---|---|
| JP | 03-163591 | 7/1991 |
| JP | 09-284446 | 10/1997 |
| JP | 10-056491 | 2/1998 |
| JP | 2004-192266 | 7/2004 |
| JP | 2006-092333 | 4/2006 |
| JP | 2006-127518 | 5/2006 |

* cited by examiner

*Primary Examiner* — Edgar Guerra-Erazo

(74) *Attorney, Agent, or Firm* — Renner, Otto, Boisselle & Sklar, LLP

(57) ABSTRACT

It is possible to improve convenience for a user and obtain translation of an original sentence effectively in real time in accordance with display switching of a page. When a control portion detects a request for display switching of a page made by the user and the request for display switching of the page is detected by the control portion, a translation processing portion translates a character string in a first language included in a page after switching into a second language, and a display control portion outputs a translation result translated by the translation processing portion.

6 Claims, 5 Drawing Sheets

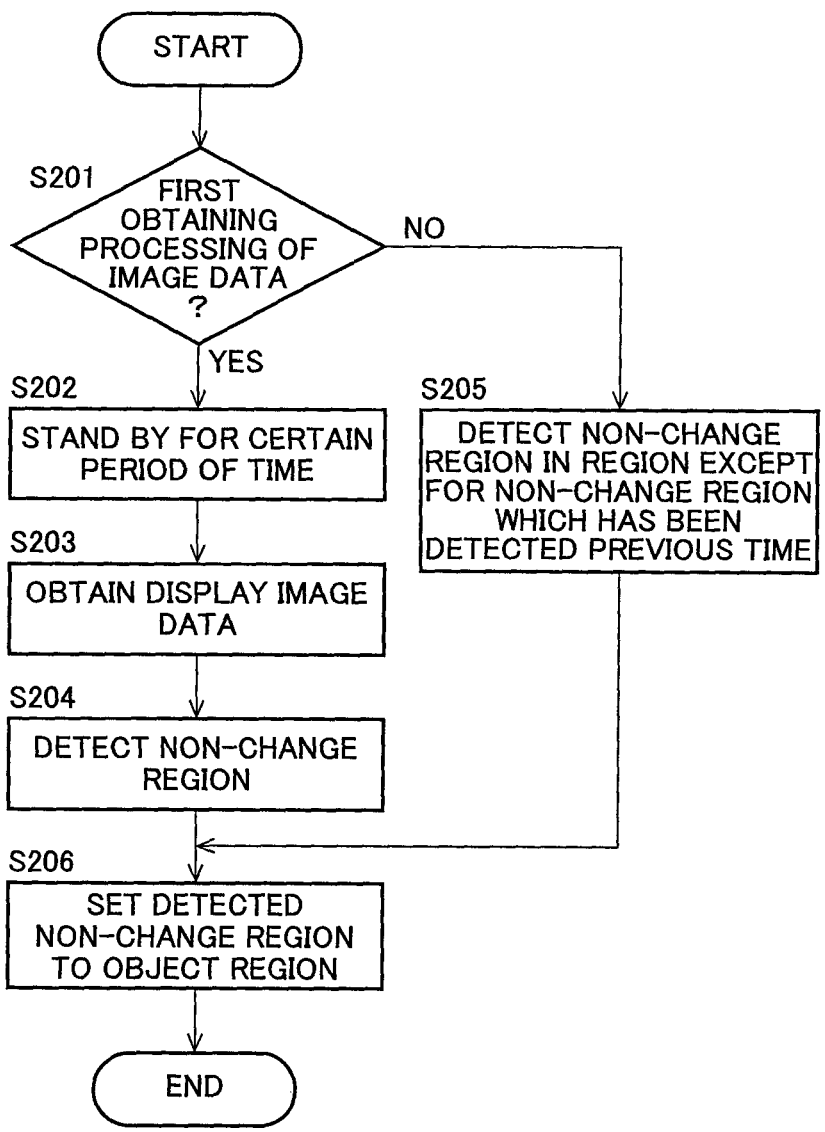

TRANSLATION APPARATUS, TRANSLATION METHOD, COMPUTER PROGRAM, AND RECORDING MEDIUM

CROSS-NOTING PARAGRAPH

This non-provisional application claims priority under 35 U.S.C. §119(a) on Patent Application No. 2010-200628 filed in JAPAN on Sep. 8, 2010, the entire contents of which are hereby incorporated herein by reference.

FIELD OF THE INVENTION

The present invention relates to a translation apparatus and a translation method for translating a character string in a first language included in a document including a plurality of pages into a second language, a computer program for realizing the translation method, and a computer readable recording medium having the computer program for realizing the translation method recorded thereon.

BACKGROUND OF THE INVENTION

In recent years, it has become common to make a presentation while presenting slides to an audience with use of presentation software on an occasion of a business meeting or a presentation at an academic conference. With presentation software which is generally used, each time a speaker presses a key of a computer, a page of slides is switched. This makes it possible for the speaker to present an appropriate page to an audience in accordance with proceedings of a presentation.

When a slide is prepared in a foreign language, it is difficult for an audience who do not know the foreign language to understand a content of the slide. Although the content of the slide is translated in advance and the translated content of the slide is displayed in some cases, there can also be a case where there is no time to spare for performing translation again when the content of the slide is changed immediately before a presentation.

Japanese Laid-Open Patent Publication No. 3-163591 discloses a control device for, while a presenter makes a presentation using a large screen display device, receiving an instruction to translate a presentation material which is displayed on the large screen display device from an audience and translating the presentation material.

However, the above-described conventional technology has such a problem that, when slides are comprised of a plurality of pages and a page which is displayed on the large screen display device is switched one after another in accordance with proceedings of the presentation, the audience have to give the instruction to translate to the control device each time a page is switched, thus the audience is forced to do a troublesome work.

Moreover, when a content of each page is translated in advance, there can also be a situation where there is no time to spare for performing translation processing again to a page in which a content is changed immediately before the presentation.

SUMMARY OF THE INVENTION

An object of the present invention is to provide a translation apparatus and a translation method capable of improving convenience for users as well as obtaining translation of an original sentence effectively in real time in accordance with display switching of a page, a computer program causing a computer to execute the translation method, and a computer readable recording medium having the computer program recorded thereon.

The object of the present invention is to provide a translation apparatus for translating, in an image showing a document including a plurality of pages, a character string in a first language included in the image into a second language, comprising: a detecting portion for detecting a request given by a user for display switching of the page; a translating portion for translating a character string in the first language included in a page after switching into the second language when the request for display switching of the page is detected by the detecting portion; and an output portion for outputting a translation result translated by the translating portion.

Another object of the present invention is to provide the translation apparatus, wherein the translation portion, in a case where the detecting portion detects the request for display switching of the page before the output portion outputs a translation result of a character string in the first language included in one page into the second language, stops translation processing for the page and starts processing of translating a character string in the first language included in a page after switching into the second language.

Another object of the present invention is to provide the translation apparatus, wherein the translating portion translates a character string in the first language into the second language word by word or collocation by collocation.

Another object of the present invention is to provide the translation apparatus, further comprising a control portion for detecting a position of a character constituting a word or a collocation in the first language, and aligning a display position of the word or the collocation in the first language with a display position of a translated word in the second language which is a translation result of the word or the collocation in the first language based on information of the detected position, wherein the output portion outputs the translation result translated by the translating position based on a result of the alignment by the control portion.

Another object of the present invention is to provide the translation apparatus, further comprising a region detecting portion for, detecting a non-change region, from a page including a region in which an image changes and the non-change region in which an image does not change along with elapse of time, wherein the translating portion translates a character string in the first language included in a non-change region of a page after switching into the second language.

Another object of the present invention is to provide the translation apparatus, wherein the region detecting portion newly performs detection of a non-change region only in a region which has not been detected as a non-change region in previous detection processing of the non-change region, and the translating portion translates a character string in the first language included in the non-change region which is newly detected by the region detecting portion into the second language.

Another object of the present invention is to provide the translation apparatus, further comprising a page storage portion for, storing a page before switching by putting a serial number thereon when the detection portion detects the request given by the user for display switching of the page.

Another object of the present invention is to provide a translation method of translating, in an image showing a document including a plurality of pages, a character string in a first language included in the image into a second language, comprising: a detecting step of detecting a request given by a user for display switching of the page; and a translating step of translating a character string in the first language included in a page after switching into the second language when the request for display switching of the page is detected by the detecting step.

Another object of the present invention is to provide a computer program for causing a computer to execute the above-described translation method.

Another object of the present invention is to provide a computer readable recording medium having the above-described computer program recorded thereon.

BRIEF DESCRIPTION OF THE DRAWINGS

FIG. 5 is a flowchart of non-change region detecting processing shown in FIG. 3.

PREFERRED EMBODIMENTS OF THE INVENTION

Figure 1:
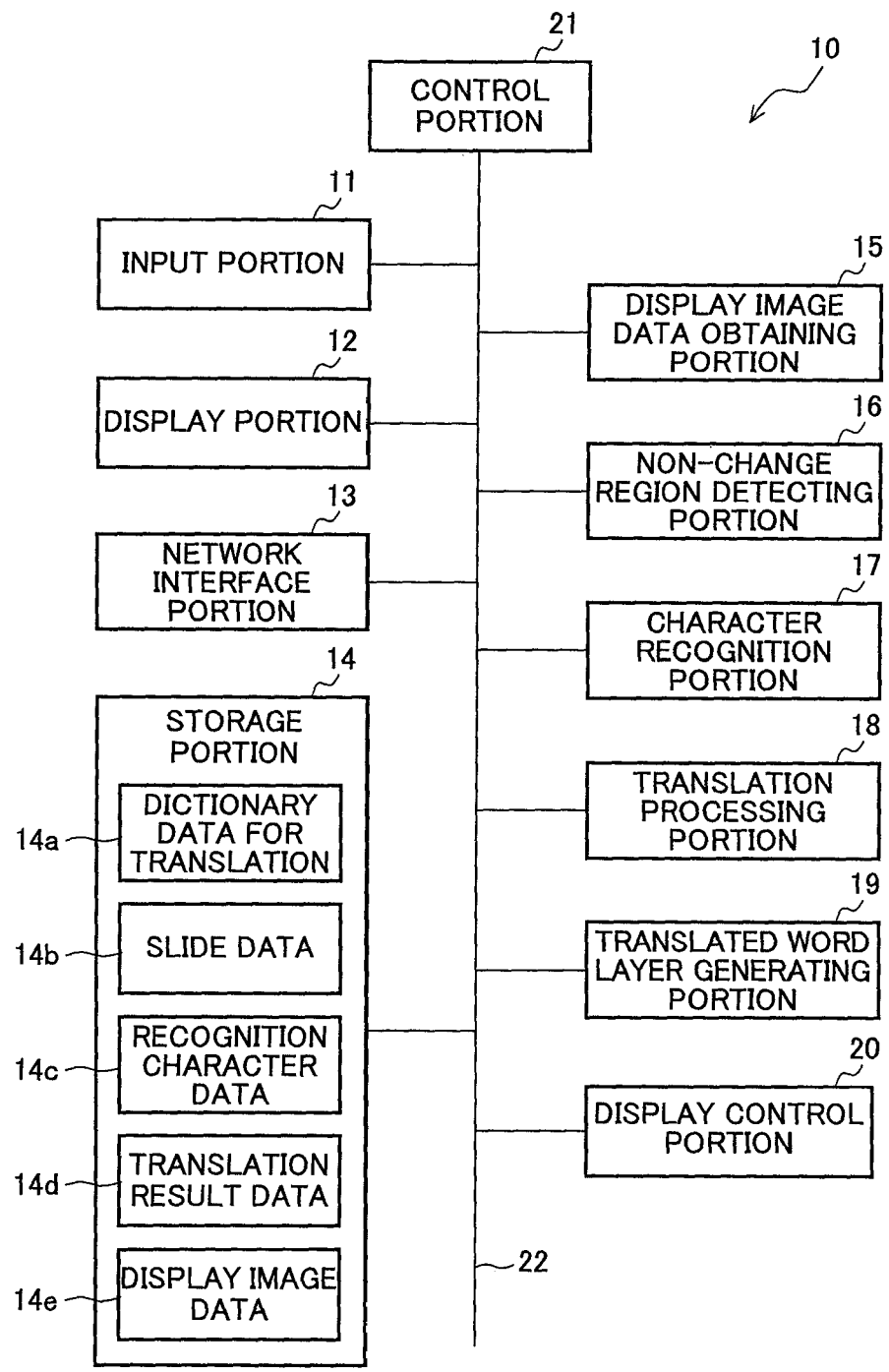
FIG. 1 is a functional block diagram of a translation apparatus according to an embodiment of the present invention.

Now, referring to the drawings, embodiments of the present invention will hereinafter be described in detail. FIG. 1 is a functional block diagram of a translation apparatus 10 according to an embodiment of the present invention. The translation apparatus 10 includes an input portion 11, a display portion 12, a network interface portion 13, a storage portion 14, a display image data obtaining portion 15, a non-change region detecting portion 16, a character recognition portion 17, a translation processing portion 18, a translated word layer generating portion 19, a display control portion 20, and a control portion 21. Respective function portions are connected to each other via bus 22, and delivering/receiving data between the respective function portions are able to be performed.

The input portion 11 is an input device such as a mouse or a keyboard that receives input from a user, and is provided with a button or the like for the user to operate the translation apparatus 10. The display portion 12 is a display device such as an LCD (Liquid Crystal Display), a CRT (Cathode Ray Tube) or a PDP (Plasma Display Panel) that displays characters and images. Note that, the input portion 11 and the display portion 12 are assumed to be incorporated in a main body of the translation apparatus 10 here, however the input portion 11 and the display portion 12 may be provided separately from the main body of the translation apparatus 10 and connected to the main body via a signal line. Furthermore, the input portion 11 and the display portion 12 may be comprised of a touch panel or a tablet.

The network interface portion 13 is a network interface that performs communication with an external apparatus via an IP (Internet Protocol) network such as a LAN (Local Area Network) or a WAN (Wide Area Network).

The storage portion 14 is a storage device such as a flash ROM (Read Only Memory), an EEPROM (Electrically Erasable and Programmable ROM), or an HD (Hard Disk). The storage portion 14 stores various data used by the translation apparatus 10, such as dictionary data for translation 14a, slide data 14b, recognition character data 14c, translation result data 14d and display image data 14e.

The dictionary data for translation 14a is data that includes words and collocation in each language and translated words thereof, along with grammar data of each language and data of appearance frequency of each syntax. The slide data 14b is data of slides comprised of a plurality of pages used by presentation software during presentation. The recognition character data 14c is data such as a type or a position of each character obtained as a result of character recognition (X-coordinate and Y-coordinate in upper right corner, bottom right corner, upper left corner and bottom left corner respectively in a rectangular region enclosing each character with a minimum area). The translation result data 14d is data in which a translated word which is obtained as a result of translation is stored in association with a word or a collocation in an original sentence. The display image data 14e is data of an image displayed on the display portion 12, the image including a character string to be translated.

Note that, it is not necessary that data has been stored in the storage portion 14 in advance. For example, data stored in an external memory may be read out by a driver to be stored in the storage portion 14. Further, data may be downloaded from an external apparatus via the network interface portion 13 to be stored in the storage portion 14. For example, data may be downloaded from a personal computer for presentation which is prepared separately from the translation apparatus 10 so that the data is stored in the storage portion 14.

The display image data obtaining portion 15 is a processing portion that obtains data of an image displayed on the display portion 12. The display image data obtaining portion 15 obtains data of an image by using, for example, a means for obtaining a display screen such as corresponding to (similar to) a print screen in terms of a function of a computer.

The non-change region detecting portion 16 is a processing portion that compares image data obtained at different time points by the display image data obtaining portion 15, detects a non-change region in which an image does not change therebetween as a region to be translated, and excludes a region in which an image changes from a region to be translated by means of masking. There is a possibility that a character string in the region in which the image changes may be a character string to be displayed temporarily, and translating such a character string becomes wasteful, therefore the translation of the character string is not performed until there is no change of the image. The load of the translation processing in the translation apparatus 10 is thereby reduced. Note that, when an area of the changed image region is a predetermined value or less, in order not to detect movement of a small object such as a mouse cursor as the change of the image, the non-change region detecting portion 16 regards such an image region as the non-change region to be detected as the region to be translated.

The character recognition portion 17 is a processing portion that recognizes each character included in the non-change region detected by the non-change region detecting portion 16 to output as character string data. For example, the character recognition portion 17 analyzes a layout of each character in an image region, extracts a character region, and further perform character recognition of the image of each character in the extracted character region to convert into text information by using the same technology as the character recognition technology which is conventionally used in an OCR (Optical Character Recognition). Furthermore, the character recognition portion 17 stores coordinates of four corners in a rectangular region enclosing each character with a minimum area in the storage portion 14 as the recognition character data 14c along with information of the type of each character which has been recognized.

The translation processing portion 18 is a processing portion to translate a character string in a first language shown by character string data which is output by the character recognition portion 17 into a second language word by word or collocation by collocation. The translation processing portion 18 stores a translation result in the storage portion 14 as the translation result data 14*d*. Since the translation processing portion 18 performs translation word by word or collocation by collocation, it is possible to prevent a translation error from affecting the entire translation, and also possible to make occurrence of the translation error to be a local one even when there is an error of character input in an original sentence, and even when there is an error of character recognition of an original sentence.

The translated layer generating portion 19 is a processing portion that generates a translated word layer for displaying a translation result in which a word or a collocation in a first language is translated into a second language. The translated word layer is a layer in which a background is transparent and the translated word layer includes a translated word and an underline showing that the collocation in the original sentence is a discontinuous collocation.

The discontinuous collocation is one in which a different word is included between words in a collocation showing one unified meaning (such as a nominal phrase, a verbal phrase, an idiom and an idiomatic phrase). For example, as the discontinuous collocation in English, an idiom such as "take . . . into consideration" is included. On the other hand, a continuous collocation is one in which a different word is not included between words in the collocation showing one unified meaning. For example, as the continuous collocation in English, an idiom such as "take over" is included. The translated word layer is overlapped with an original sentence layer showing the original sentence so as to be displayed with the original sentence.

The translated word layer generating portion 19 generates a translated word layer in which a translated word or collocation corresponding to a word or a collocation in an original sentence is arranged in proximity to the original word or collocation. Thereby a user is able to easily perform confirmation of the correspondence relation between the original sentence and a translation result thereof.

Specifically, the translated word layer generating portion 19 calculates a distance between respective lines included in the original sentence. The translated word layer generating portion 19 obtains Y coordinate of an upper end and a lower end of a first character of each line, calculates a distance between the lower end of the first character in one line and the upper end of a first character in a next line so as to calculate a distance between the respective lines.

Further, the translated word layer generating portion 19 obtains one of the translated words obtained by the processing of the translation processing portion 18, and checks whether or not the translated word is the one obtained as the translation result of the discontinuous collocation. When the translated word is the one obtained as the translation result of the discontinuous collocation, the translated word layer generating portion 19 generates a transparent translated word layer, and arranges an underline at a position on the translated word layer which corresponds to the lower portion of the discontinuous collocation in the original sentence.

Further, the translated word layer generating portion 19 compares the lengths of a first word included in the discontinuous collocation (in the above-described example, "take"), a continuous word sequence ("into consideration"), and a longest word ("consideration"), and sets the maximum length one among them ("into consideration") as a word or a continuous word sequence in proximity to which a translated word is displayed.

When the translated word is not the one obtained as the translation result of the discontinuous collocation, namely, when the translated word is one obtained by the translation result of a word or a continuous collocation, the translated word layer generating portion 19 sets the word or the continuous word sequence in the original sentence corresponding to the translated word as the word or the continuous word sequence in proximity to which a translated word is displayed.

The translated word layer generating portion 19 then compares the distance between lines of the original sentence with a vertical length of a character of the original sentence. Then, the translated word layer generating portion 19, when the distance between the lines is less than 40% of the vertical length of the character, sets a vertical length of a font for displaying the translated word to be 40% of the vertical length of the above-described character, and when the distance between the lines exceeds 80% of the vertical length of the character, sets the vertical length of the above-described font to be 80% of the vertical length of the above-described character, and when the distance between the lines is 40% to 80% of the vertical length of the character, sets the vertical length of the above-described font to be the same as the length of the distance between the lines. Note that, a threshold different from 40% and 80% may be used.

Furthermore, the translated word layer generating portion 19 sets an X coordinate of a left end of a first character in the word or the continuous word sequence in proximity to which a translated word is displayed as a left end of an arrangement space in which the translated words are arranged, and sets an X coordinate of a right end of a last character in the word or the continuous word sequence in proximity to which a translated word is displayed as a right end of the above-described arrangement space. The translated word layer generating portion 19 then calculates a horizontal length of the arrangement space (namely, a distance between the left end and the right end). On the other hand, the translated word layer generating portion 19 multiplies the number of characters of the translated word by a horizontal length of the font for displaying the translated word to calculate a display length of the translated word. Then, the translated word layer generating portion 19 checks whether or not the horizontal length of the arrangement space is longer than the display length of the translated word.

When the horizontal length of the arrangement space is longer than the display length of the translated word, the translated word layer generating portion 19 sets a left end position in the arrangement space as a horizontal position where the arrangement of the translated words is started. Furthermore, the translated word layer generating portion 19 calculates an average value of the Y coordinates of a lower end of each character included in the word or the continuous word sequence in proximity to which a translated word is displayed, and a position which is displaced downward from the average value by an amount of the vertical length of the font is set as a vertical position at which the translated word is arranged.

When the horizontal length of the arrangement space is not longer than the display length of the translated word, the translated word layer generating portion 19 multiplies a rate of the horizontal length of the arrangement space with respect to the display length of the translated word by a font size of the translated word, so that the translated word is arranged in a font size of a value obtained as a result thereof.

However, when the above-described rate is smaller than a predetermined threshold, the translated word layer generating portion 19 checks whether or not there is a word for which a translated word is not arranged backward and forward of the word or the continuous word sequence in proximity to which a translated word is displayed (for example, "a", "the" and the like). Then the translated word layer generating portion 19 sets, when there is a word for which a translated word is not arranged forward thereof, a position which is displaced backward from a center position of the word placed forward by a predetermined distance as a position at which the arrangement of the translated word is started, and starts to arrange the translated word from the position. The translated word layer generating portion 19 sets, when there is a word for which a translated word is not arranged backward thereof, an X coordinate of a right end of a last character in the word placed backward as a terminal position at which the arrangement of the translated word is completed, and displaces the translated word backward to be arranged so that the arrangement of the translated word is completed at the position. The translated word layer generating portion 19 performs, when there is a word for which a translated word is not arranged forward or backward, either one of the above-described processing.

Furthermore, when there is no word for which a translated word is not arranged backward and forward of the word or the continuous word sequence in proximity to which a translated word is displayed, the translated word layer generating portion 19 arranges the translated word of a word or a continuous word sequence to be processed in consideration of the length of the translated words arranged to the words backward and forward thereof.

Figure 2A:
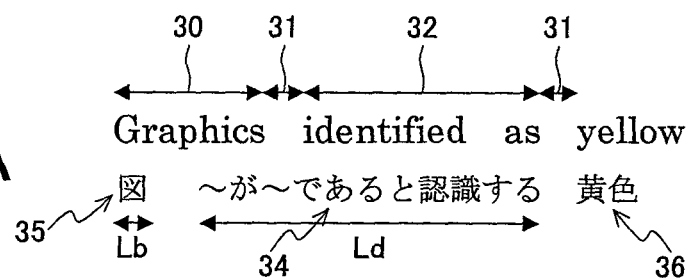
FIGS. 2A and 2B are diagrams showing one example of arrangement of a translated word.
Figure 2B:
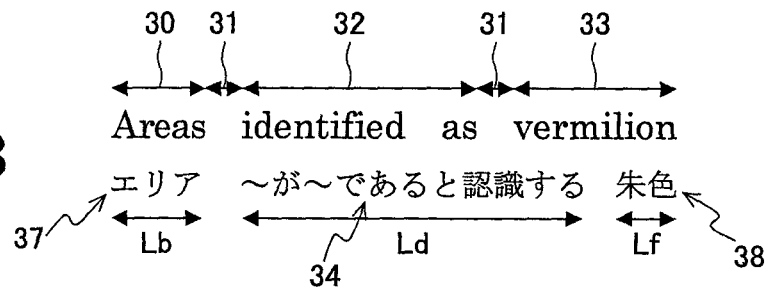

FIGS. 2A and 2B are diagrams showing an example of arrangement of translated words. When a translated word (translated word 34, in this example) for a word or a continuous word sequence to be processed is arranged, the translated word layer generating portion 19 firstly checks whether or not a horizontal length Lb of a translated word of a word placed forward (translated word 35) is shorter than a length La which a minimum arrangement interval in which translated words (translated word 35, translated word 34 and translated word 36) are arranged is subtracted from a horizontal length 30 of the word placed forward ("Graphics"). Then, when the length Lb is shorter than the length La, as shown in FIG. 2A, the translated word layer generating portion 19 performs processing that moves a position at which the translated word (translated word 34) is arranged further forward. Here, the minimum arrangement interval is a minimum value of a horizontal length of a space provided between translated words so that the translated words (translated word 35, translated word 34 and translated word 36) are able to be distinguished from each other.

In this case, the translated word layer generating portion 19 determines whether or not a value Lc, which is obtained by subtracting the horizontal length Lb of the translated word of the word that is placed forward (translated word 35) and the minimum interval between the translated words (translated word 35, translated word 34 and translated word 36) from a sum of a horizontal length 32 of space in which the translated word (translated word 34) is to be originally arranged, intervals 31 between words in a line of an original sentence, and the horizontal length 30 of the word that is placed forward ("Graphics"), is larger than a value Ld of a display length of the translated word (translated word 34) of the word or the continuous word sequence to be processed.

When the value Lc is larger than the value Ld, the translated word layer generating portion 19 modifies the horizontal length of the arrangement space so that a position locating to the left of the right end of the arrangement space by an amount of the value Ld comes to the left end of the arrangement space, and arranges the translated word (translated word 34) from the left end position. When the value Lc is not larger than the value Ld, the translated word layer generating portion 19 multiplies a ratio of the value Lc to the value Ld by a font size of the translated word (translated word 34) so as to recalculate the display length Ld of the translated word (translated word 34) using a modified font size obtained as a result thereof. Then, the translated word layer generating portion 19 modifies the horizontal length of the arrangement space so that a position locating to the left of the right end of the arrangement space by an amount of the display length Ld of the recalculated translated word (translated word 34) comes to the left end of the arrangement space, and arranges the translated word (translated word 34) in the modified font size from the left end position.

As shown in FIG. 2B, when the length Lb is not shorter than the Length La, the translated word layer generating portion 19 checks whether or not a horizontal length Lf of a translated word of a word that is placed backward (translated word 38) is smaller than a length Le which is obtained by subtracting a minimum interval between the translated words (translated word 37, translated word 34 and translated word 38) from a horizontal length 33 of a word that is placed backward ("vermilion"). Then, when the length Lf is smaller than the length Le, the translated word layer generating portion 19 performs processing that moves a position at which the translated word of the word that is placed backward (translated word 38) further backward.

In this case, the translated word layer generating portion 19 determines whether or not a value Lg which is obtained by subtracting the horizontal length Lf of the translated word of the word that is placed backward (translated word 38) and the minimum interval between the translated words (translated word 37, translated word 34 and translated word 38) from a sum of the horizontal length 32 of the space in which the translated word (translated word 34) is to be originally arranged, the intervals 31 between words in a line of an original sentence, and the horizontal length 33 of the word that is placed backward ("vermilion") is larger than a value Ld of the display length of the translated word (translated word 34) of the word or the continuous word sequence to be processed.

When the value Lg is larger than the value Ld, the translated word layer generating portion 19 modifies the horizontal length of the arrangement space so that a position locating to the right of the left end of the arrangement space by an amount of the value Ld comes to the right end of the arrangement space. Then the translated word layer generating portion 19 sets a starting position from which the arrangement of the translated word of the word that is placed backward (translated word 38) is started at a position located to the left of the right end of a last character ("n") of the word placed backward ("vermillion") by an amount of the horizontal length Lf of the translated word of the word that is placed backward (translated word 38), and arranges the translated word of the word that is placed backward (translated word 38) to the right side from the original position. Then, the translated word layer generating portion 19 arranges the translated word (translated word 34) of the word or the continuous word sequence to be processed, from the left end of the arrangement space in which the horizontal length is modified.

When the value Lg is not larger than the value Ld, the translated word layer generating portion 19 multiplies the ratio of the value Lg to the value Ld by the font size of the translated word (translated word 34) so as to recalculate the display length Ld of the translated word (translated word 34) using a modified font size which is obtained as a result thereof. Then, the translated word layer generating portion 19 modifies the horizontal length of the arrangement space so that a position locating to the right of the left end of the arrangement space by an amount of the recalculated value Ld comes to the right end of the arrangement space. Further, the translated word layer generating portion 19 sets a starting position from which the arrangement of the translated word of the word that is placed backward (translated word 38) is started at a position located to the left of the right end of the last character ("n") of the word placed backward ("vermillion") by an amount of the horizontal length Lf of the translated word of the word placed backward (translated word 38), and arranges the translated word of the word that is placed backward (translated word 38) to the right side from the original position. Then, the translated word layer generating portion 19 arranges the translated word (translated word 34) of the word or the continuous word sequence to be processed, in the modified font size from the left end of the arrangement space in which the horizontal length is modified.

The display control portion 20 is a processing portion that controls information display performed by the display portion 12. When the input portion 11 receives a request for display switching of a page of a slide from a user, the display control portion 20 performs processing to display a next page on the display portion 12. Moreover, the display control portion 20 performs processing such as laying a translated word layer generated by the translated word layer generating portion 19 on an original sentence layer so that an original word or collocation included in the original sentence layer is displayed on the display portion 12 in association with translation result thereof.

The control portion 21 is a processing portion that integrally controls the translation apparatus 10. The control portion 21 controls delivering/receiving data between respective function portions. Moreover, when a user makes a presentation using slides comprised of a plurality of pages, the control portion 21 determines whether or not the input portion 11 has received a request for switching a page displayed on the display portion 12 from the user. Then, in a case where the input portion 11 has received the request for switching the page before the translation result of the page displayed on the displaying portion 12 is displayed on the display portion 12, then in synchronization with the reception of the request for switching the page, the control portion 21 performs processing of instructing the non-change region detecting portion 16, the character recognition portion 17, the translation processing portion 18, the translated word layer generating portion 19, and the display control portion 20 to stop the translation processing of the page which is currently displayed or the display processing of the translation result as well as instructing the display image data obtaining portion 15 to obtain image data of a switched page to be displayed on the display portion 12.

The translation processing and the display processing of the translation result are performed with respect to the image data after switching obtained by the control portion 21 in this way, and thereby it is possible to prevent such a situation that translated words of the previous page are displayed even though the page has been switched so that an inconsistency between the original sentence and the translated words is generated. Furthermore, the wasteful translation processing or display processing is stopped, and thereby a load of the translation apparatus 10 is reduced so that the translation processing is able to be performed more smoothly in real time following the display screen of the presentation in progress.

Furthermore, the control portion 21 detects that the input portion 11 has received a request for display switching a page, then stores in the storage portion 14 each image data as the display image data 14e by putting a serial number thereon following the order obtained by the display image data obtaining portion 15. By using this image data the translation processing and display processing of each page is able to be performed at a time afterwards. Note that, when there is no necessity to perform translation of each page at a time afterwards, the control portion 21 may discard the image data of the page before switching.

Figure 3:
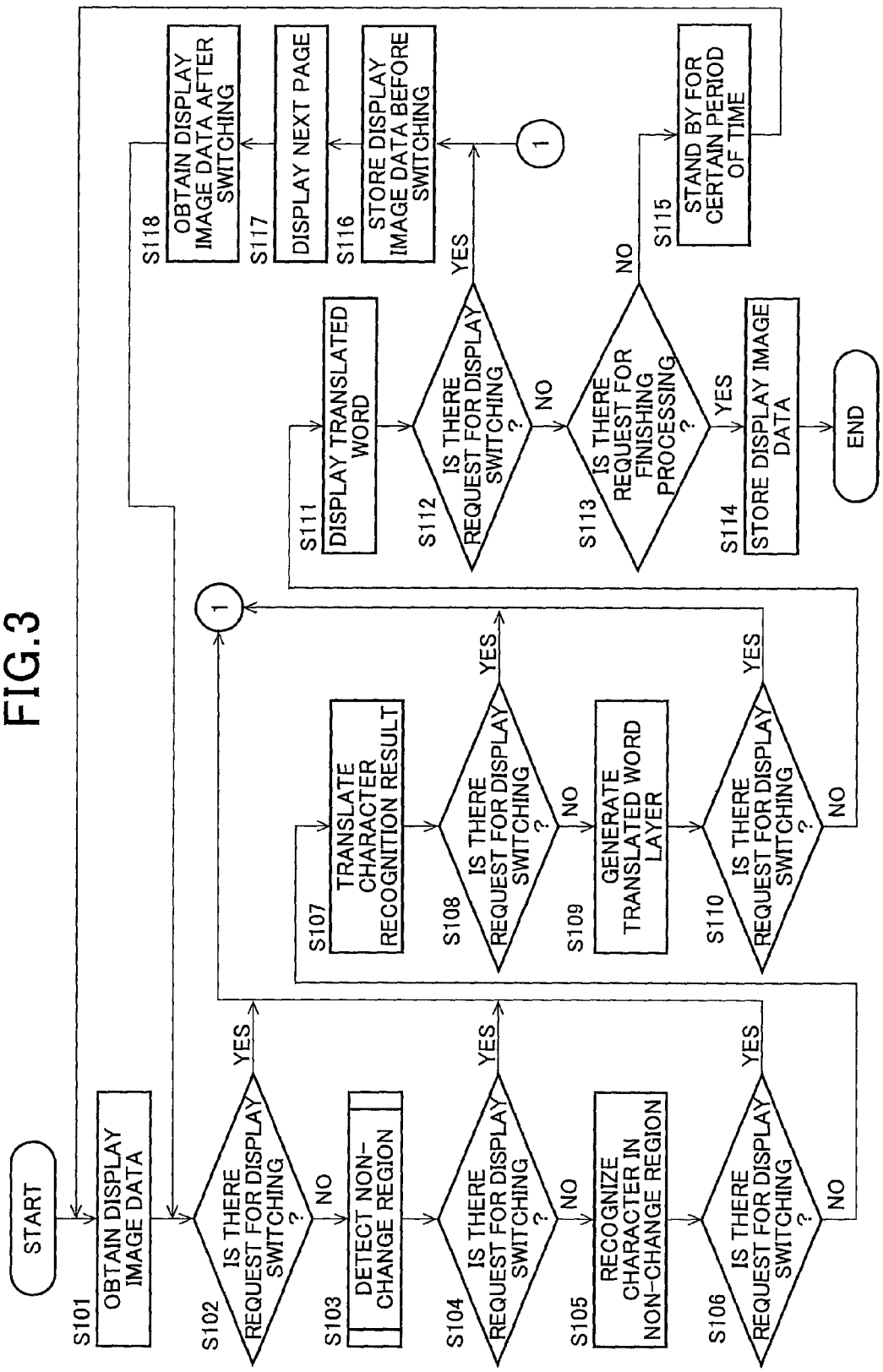
FIG. 3 is a flowchart of translation processing according to an embodiment of the present invention.

Next, translation processing according to an embodiment of the present invention will be described. FIG. 3 is a flowchart of translation processing according to the present embodiment. In the flowchart of FIG. 3, it is assumed that an image of a first page of slides is already displayed on the display portion 12. As shown in FIG. 3, the display image data obtaining portion 15 of the translation apparatus 10 obtains image data of the image which is displayed on the display portion 12 (step S101). Then, the control portion 21 checks whether or not the input portion 11 has received a request for display switching of a page of a slide from a user (step S102).

In a case where the input portion 11 has received the request for display switching of the page (in the case of YES at step S102), the control portion 21 stores in the storage portion 14 the image data of a page before switching by putting a serial number thereon following the order obtained by the display image data obtaining portion 15 (step S116). The display control portion 20 then displays a next page on the display portion 12 (step S117). Then, the display image data obtaining portion 15 obtains image data of a page after switching (step S118), and continues processing at and after step S102 with respect to the obtained image data.

In a case where the input portion 11 has not received the request for display switching of the page (in the case of NO at step S102), the non-change region detecting portion 16 detects a non-change region in which an image does not change in a display image of the page of the slide as a region including a character string to be translated (step S103). For example, when there is a region displaying a moving image on the page of the slide, the non-change region detecting portion 16 excludes the region, and except for the region, detects a non-change region in which an image does not change as a region including a character string to be translated. This detection processing will be described in detail later.

The control portion 21 then checks again whether or not the input portion 11 has received the request for display switching of the page from the user (step S104). In a case where the input portion 11 has received the request for display switching of the page (in the case of YES at step S104), the control portion 21 stores in the storage portion 14 the image data of the page before switching by putting a serial number thereon following the order obtained by the display image data obtaining portion 15 (step S116), and continues processing at and after step S117.

In a case where the input portion 11 has not received the request for display switching of the page (in the case of NO at step S104), the character recognition portion 17 performs character recognition for a character which is included in the non-change region to output the recognized character as text data (step S105). Then, the control portion 21 checks again whether or not the input portion 11 has received the request for display switching of the page from the user (step S106). In a case where the input portion 11 has received the request for display switching of the page (in the case of YES at step S106), the control portion 21 stores in the storage portion 14 image data of the page before switching by putting a serial number thereon following the order obtained by the display image data obtaining portion 15 (step S116), and continues processing at and after step S117.

In a case where the input portion 11 has not received the request for display switching of the page (in the case of NO at step S106), the translation processing portion 18 performs translation processing for the text data output by the character recognition portion 17 (step S107). The control portion 21 then checks again whether or not the input portion 11 has received the request for display switching of the page from the user (step S108). In a case where the input portion 11 has received the request for display switching of the page (in the case of YES at step S108), the control portion 21 stores in the storage portion 14 image data of the page before switching by putting a serial number thereon following the order obtained by the display image data obtaining portion 15 (step S116), and continues processing at and after step S117.

In a case where the input portion 11 has not received the request for display switching of the page (in the case of NO at step S108), the translated word layer generating portion 19 generates a translated word layer in which a translated word is arranged in association with a word or a collocation in an original sentence (step S109). The control portion 21 then checks again whether or not the input portion 11 has received the request for display switching of the page from the user (step S110). When the input portion 11 has received the request for display switching of the page (in the case of YES at step S110), the control portion 21 stores in the storage portion 14 image data of the page before switching by putting a serial number thereon following the order obtained by the display image data obtaining portion 15 (step S116), and continues processing at and after step S117.

In a case where the input portion 11 has not received the request for display switching of the page (in the case of NO at step S110), the display control portion 20 displays the translated word on the display portion 12 in association with the word or the collocation in the original sentence by laying the translated word layer on an original sentence layer (step S111).

The control portion 21 then checks again whether or not the input portion 11 has received the request for display switching of the page from the user (step S112). In a case where the input portion 11 has received the request for display switching of the page (in the case of YES at step S112), the control portion 21 stores in the storage portion 14 image data of the page before switching by putting a serial number thereon following the order obtained by the display image data obtaining portion 15 (step S116), and continues processing at and after step S117.

In a case where the input portion 11 has not received the request for display switching of the page (in the case of NO at step S112), the control portion 21 checks whether or not the input portion 11 has received a request for finishing translation processing from the user (step S113). In a case where the input portion 11 has not received the request for finishing the translation processing (in the case of NO at step S113), the display image data obtaining portion 15 obtains again image data of a same page in order to detect a non-change region from a region except for a region which has already been detected as a non-change region as to the same page, and at the time, stands by for a certain period of time to maintain an interval between image data acquisition constant (step S115).

Then, the display image data obtaining portion 15 obtains again image data of the image which is displayed on the display portion 12 (step S101), and processing at and after step S102 is performed for the obtained image data. In a case where the input portion 11 has received the request for finishing the translation processing (in the case of YES at step S113), the control portion 21 stores in the storage portion 14 image data of a page which has been obtained at the end by putting a serial number thereon following the order obtained by the display image data obtaining portion 15 (step S114), and finishes this translation processing.

Figure 4:
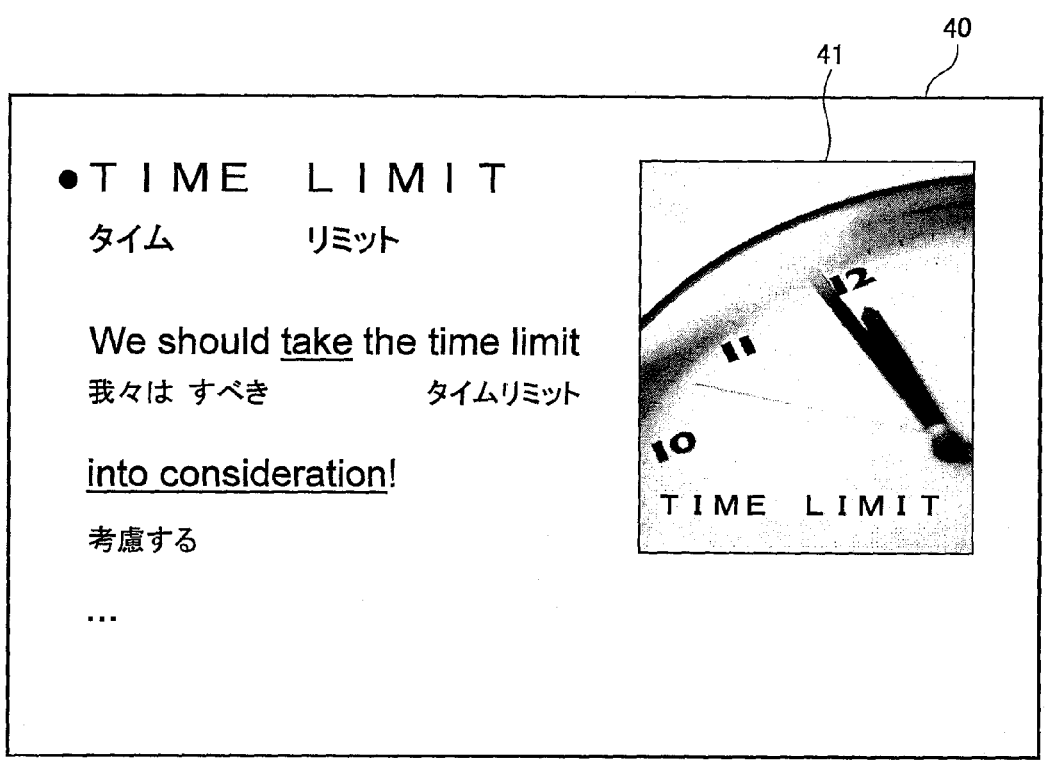
FIG. 4 is a diagram showing a display example of a slide generated by means of the translation processing according to an embodiment of the present invention.

FIG. 4 is a diagram showing a display example of a slide generated by translation processing according to an embodiment of the present invention. A slide 40 shown in FIG. 4 shows a moving image region 41 in which an image changes with time and a non-change region except for the moving image region 41 in which an image does not change with time. For example, in this moving image region 41, it is assumed that change of the image is generated such that a picture of a clock and characters of "TIME LIMIT" gradually fade away with time and are displayed again, and the like. In such a case, when translation processing according to the embodiment of the present invention is applied thereto, a character string of "TIME LIMIT" in the moving image region 41 is not translated while only a character string ("TIME LIMIT", "We should take the time limit into consideration!") in the non-change region except for the moving image region 41 is translated. Additionally, in a case where the request for display switching of a page of the slide 40 has been received from the user before output of a translation result of the character string in the non-change region is finished, translation processing or output processing of the translation result for the page is stopped to start translation processing and output processing for a page to be displayed next.

Next, the non-change region detection processing (step S103) shown in FIG. 3 will be described in detail. FIG. 5 is a flowchart of the non-change region detection processing shown in FIG. 3. As shown in FIG. 5, the non-change region detecting portion 16 of the translation apparatus 10 checks whether or not obtaining processing of image data for the same page which has been performed by the display image data obtaining portion 15 is the first one (step S201).

When obtaining of image data for the same page is performed for the first time (in the case of YES at step S201), the display image data obtaining portion 15 stands by for a certain period of time (step S202) to obtain again image data of the same page which is displayed on the display portion 12 (step S203). The non-change region detecting portion 16 then compares the image data obtained for the first time with image data obtained for a second time, detects a non-change region in which an image does not change between these image data and masks a changed image region (step S204). Then, the non-change region detecting portion 16 sets the detected non-change region as a region which includes a character to be translated (step S206).

Here, the non-change region detecting portion 16 is able to set a non-change region by designating coordinates. Alternatively, the non-change region detecting portion 16 masks the region in which the image changes by designating the region with coordinates or by filling the region with a specific color, selects a remaining non-change region as a region including a character to be translated, and is able to set the non-change region.

When obtaining of image data for the same page is not the first time (in the case of NO at step S201), the non-change region detecting portion 16 compares the image obtained previous time (for a (j−1)-th time) with the image obtained this time (for a j-th time) in a region except for the non-change region which has been detected previous time (for a (j−1)-th time where j≥3) to detect a non-change region again (step S205). Then, the non-change region detecting portion 16 sets the detected non-change region as a region which includes a character to be translated (step S206).

As to a character which is included in the non-change region detected previous time (for the (j−1)-th time), the translation processing portion 18 has already performed translation to store a translation result in the storage portion as the translation result data 14d. Therefore, the translated word layer generating portion 19 generates a translated word layer from a translation result of a character string which is included in a non-change region detected this time (for the j-th time) and a translation result of a character string which is included in the non-change region detected the previous time (for the (j−1)-th time). In this way, it is possible to reduce a load of translation processing performed by the translation apparatus 10 by involving only a character string which is included in a non-change region which has not been translated in the past for the translation and excluding a character string in a non-change region which has been translated in the past from an object of translation processing.

Note that, at step S205 of FIG. 5, it is assumed that a range of detecting a non-change region is limited to inside of a region except for the non-change region which has been detected the previous time, however, it may be configured such that a non-change region is detected from inside of all the regions of an image. Whereby even when an image which did not change at the time of detecting the non-change region the previous time changes thereafter, a character string which is included in the image is updated, and the image becomes a non-change image again thereafter, it is possible to appropriately obtain a translated word of an undated character string.

So far, embodiments of the translation apparatus 10 and a translation method has been mainly described, however, the present invention is not limited to these embodiments, and the present invention may be implemented as an embodiment as a computer program for realizing a function of the translation apparatus 10 or an embodiment of a computer readable recording medium having the computer program recorded thereon.

Here, it is possible to employ various forms of recording media such as a disk type (for example, a magnetic disk, an optical disk and the like), a card type (for example, a memory card, an optical card and the like), a semiconductor memory type (for example, a ROM, a non-volatile memory and the like), and a tape type (for example, a magnetic tape, a cassette tape and the like).

By recording the computer program for realizing a function of the translation apparatus 10 or the computer program for causing a computer to execute the translation method in the present embodiment described above on these recording media for distribution, it is possible to reduce cost and improve portability or versatility.

In addition, the above-described recoding medium is mounted to a computer, a computer program recorded on the recording medium is read out by the computer and stored in a memory, and the computer program is read out from the memory and executed by a processor (CPU: Central Processing Unit, MPU: Micro Processing Unit) provided in the computer, so that it is possible to realize a function of the translation apparatus 10 according to the present embodiment and to execute the translation method.

Additionally, the present invention is not limited to the above-described embodiments, and various modifications and amendments are possible within a range without departing from the gist of the present invention. For example, in the above-described embodiments, a case where a user makes a presentation while switching slides comprised of a plurality of pages has been described, however, a range of application of the present invention is not limited thereto, and it is possible to apply the present invention also to a case where translation of each page is performed while switching a page as to other documents except for slides.

As described above, according to the present invention, when a request for display switching of a page made by a user is detected, a character string in a first language which is included in a page after switching is translated into a second language and a translation result thereof is output, thus making it possible to improve convenience for the user and obtain translation of an original sentence effectively in real time in accordance with switching of a page.

The invention claimed is:

1. A translation apparatus for translating, in an image showing a document including a plurality of pages, a character string in a first language included in the image into a second language different from the first language, the translation apparatus comprising:
a detecting portion that detects a request given by a user for display switching from a page of the document to another page of the document;
a translating portion that translates a character string in the first language included in the another page after switching into the second language when the request for display switching from the page of the document to the another page of the document is detected by the detecting portion; and
an output portion that outputs a translation result translated by the translating portion,
wherein the translating portion translates a character string in the first language into the second language word by word or collocation by collocation.

2. The translation apparatus as defined in claim 1, wherein the translation portion, in a case where the detecting portion detects the request for display switching of the page before the output portion outputs a translation result of a character string in the first language included in one page into the second language, stops translation processing for the page and starts processing of translating a character string in the first language included in a page after switching into the second language.

3. The translation apparatus as defined in claim 1, further comprising a control portion for detecting a position of a character constituting a word or a collocation in the first language, and aligning a display position of the word or the collocation in the first language with a display position of a translated word in the second language which is a translation result of the word or the collocation in the first language based on information of the detected position, wherein the output portion outputs the translation result translated by the translating portion based on a result of the alignment by the control portion.

4. The translation apparatus as defined in claim 1, further comprising a region detecting portion for, detecting a non-change region, from a page including a region in which an image changes and the non-change region in which an image does not change along with elapse of time, wherein the translating portion translates a character string in the first language included in a non-change region of a page after switching into the second language.

5. The translation apparatus as defined in claim 4, wherein the region detecting portion newly performs detection of a non-change region only in a region which has not been detected as a non-change region in previous detection processing of the non-change region, and the translating portion translates a character string in the first language included in the non-change region which is newly detected by the region detecting portion into the second language.

6. The translation apparatus as defined in claim 1, further comprising a page storage portion for, storing a page before switching by putting a serial number thereon when the detection portion detects the request given by the user for display switching of the page.

\* \* \* \* \*